May 9, 1933. R. J. NORTON 1,908,438
BRAKE ACTUATOR
Filed July 18, 1930
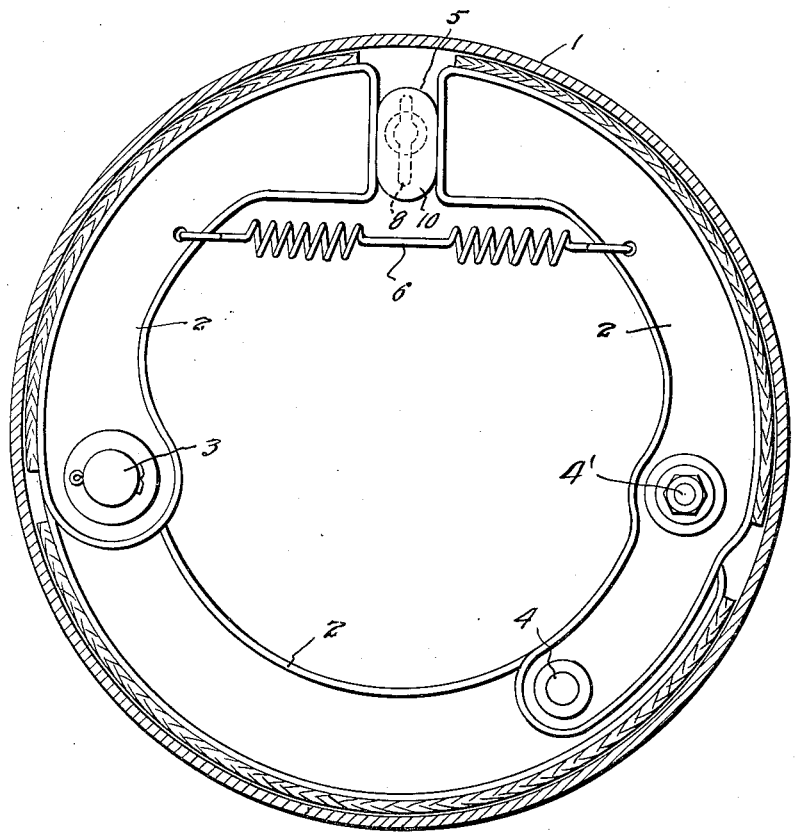
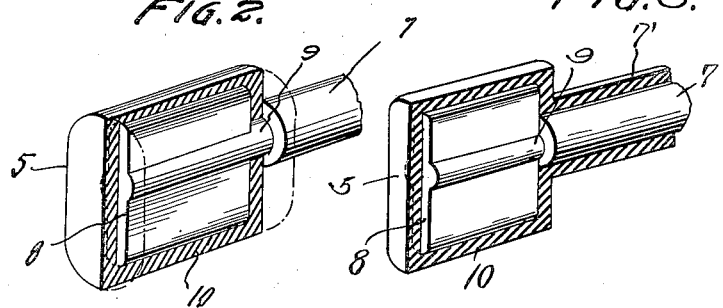
Inventor
RAYMOND J. NORTON
By Semmes + Semmes and
M. W. McConkey
Attorneys Patented May 9, 1933

1,908,438

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE ACTUATOR

Application filed July 18, 1930. Serial No. 468,932.

The invention relates to improvements in brake actuators.

The usual type of internal expanding brake consists of two or more shoes pivotally anchored to a backing plate and expanded, at their free ends, by means of a cam or equivalent member. Since the cam and the shoes rotate on different arcs of curvature there is relative movement between the two members and consequently some wear. Since the cam in effect slides over the contiguous surfaces of the brake shoes the frictional characteristics of these members are important factors in determining the efficiency of brake operation.

The major purpose of the present invention is to provide a novel type of cam which at one time presents a surface which is highly resistant to abrasion and which possesses a low coefficient of friction so as to insure prolonged efficient operation.

Another object of the invention is to provide a non-metallic brake cam.

Yet another object is to provide a brake actuator composed of a synthetic resin.

A further object is to provide a permanently lubricated brake actuator.

With the foregoing and other important objects in view the invention comprehends the provision of a brake cam at least the shoe abutting surfaces of which are composed of a non-metallic material in which is substantially, permanently embodied a lubricant so as to insure smooth operation with minimal frictional resistance.

In order to make the invention more readily understood there is shown in the accompanying drawing a typical physical embodiment.

Figure 1 is an elevation of a typical brake of the internal expanding 3-shoe servo brake type.

Figure 2 is an enlarged detail of the brake actuator.

Figure 3 is an enlarged detail of a modified form.

In the preferred embodiment the invention includes the idea of impregnating suitable fibrous material such as paper, cloth, asbestos, or the like, with the components of a synthetic resin and a suitable lubricant. The ingredients of the resin may be caused to react in a manner well known to those skilled in the art to form a hard infusible substance in which is permanently incorporated any predetermined amount of the lubricant. Any suitable synthetic resin possessing the desired characteristics of high resistance to abrasion and relatively low coefficient of friction may be employed. As indicative of such resins may be mentioned resins of the phenol methylene type, furfural, acetylene resin, and so forth.

To more clearly explain the practice of the invention a particular resin will be described. This is given as indicative of any other equivalent non-metallic material which will function in the manner described.

Because of its ease of molding in a metal matrix, its high reactivity and the pleasing appearance of the resulting products the cam member may be composed of a condensation product of furfural and phenol or their equivalents. In carrying out the invention a strip of paper or other suitable fibrous material may be treated with any desired lubricant such as graphite, paraffin, linseed oil, neat's-foot oil.

Where a liquid lubricant is employed it may first be dissolved in a suitable solvent such as benzol and the solution employed to impregnate the fibrous filler material. The impregnated filler material may then be treated with a solution of the infusible form of the resin in which has been incorporated a hardener. Under the application of heat and pressure in a manner well known the fusible form of the resin is transformed to the infusible form.

The method of making up the resin is well known to those skilled in the art. This may be done by reacting predetermined amounts of furfural and phenol in the presence of a suitable catalyst such as hydrochloric acid. The phenol crystals are fused and the furfural and acid catalyst then added; the amount of furfural, or equivalent material, used is insufficient to form the infusible resin. The materials are allowed to react and are then heated to expel excess water and acid; the excess phenol may be removed by distillation with steam; residual traces of acid may be neutralized with a suitable alkali. The resulting product, which is a fusible gum, is then dissolved in an appropriate solvent such as acetone, alcohol or the like. To the fusible resin is then added a quantity of a hardening agent which, upon reaction, will insure the formation of infusible condensation products, such hardening agent may comprise furfural and ammonia, furfuramid, hexamethylenetetramine, and so forth.

The potentially reactive combination is then used as the impregnant for the filler material. After impregnation of the fibrous substances by the resin the material may be placed in a suitable mold and heated under pressure to insure the formation of the hard infusible resin.

If desired the non-metallic cam surface may be made up of laminated strips which may be built up in the form of a stack and cemented together by means of the phenolic condensation product to form an element of the desired thickness.

In one form of the invention the cam is composed of a metal plate in the nature of a spider about which is moulded the condensation product either in the relatively pure form or as a filled or laminated structure.

As shown in the drawing the invention may be embodied in the brake apparatus comprising the cylindrical brake drum 1, within which are mounted the internal expanding shoes 2. In the modification shown the brake structure includes a reverse and secondary shoe directly pivoted on the anchor pin 3 and a servo shoe pivotally connected to the unanchored end of the secondary or loaded shoe at 4. An anti-rattling device is provided for the servo shoe at 4'. Obviously, however, the improved brake actuator herein described may be used with any type of shoe structure.

The shoes are expanded under the action of the improved cam member 5, and are returned to inoperative position by means of the return spring 6. The brake actuator may, for example, comprise a metallic cam shaft 7, the end of which is flattened out to form a plate or spider 8. If desired, the cam shaft may have a reduced cylindrical section 9 between the main shaft 7 and the plate 8. The plate or spider 8, it will be noted, is vertically elongated so as to provide a relatively wide bearing surface for the moulded product in the direction of the brake applying thrusts. This spider forms the core, as clearly shown in Figure 2, about which the non-metallic lubricated surface may be moulded. When the lubricated resin is made up and moulded about the plate 8, or any similar core member, it forms a complete envelope, as shown at 10. This envelope constitutes the abutting surface of the cam and, as described, is of high wear resistance and low frictional resistance due not only to the homogeneous and smooth surface of the resin but also to the included lubricant. As noted above, any desired type of solid or liquid lubricant may be used.

If desired, and as shown in Figure 3, the condensation product may be moulded about the cam shaft 7' so as to present a bearing surface of low coefficient of friction. Where the condensation product which is employed is permanently lubricated a very desirable type of bearing is secured.

It will be appreciated that the brake actuator may be easily made up of well known materials and in a very simple and expeditious manner using metal moulds to provide a member which presents highly desirable characteristics.

While a preferred embodiment of the invention has been described it is to be understood that this is given merely as a typical embodiment as the concept herein involved is considered to reside broadly in the provision of a non-metallic cam of the described characteristics in sharp contradistinction to prior art structures which were composed entirely of metal.

I claim:

1. A brake apparatus comprising a drum, friction means within the drum, and a permanently lubricated actuator for the friction means.

2. A brake apparatus comprising a metallic shoe and a permanently lubricated cam for actuating the shoe.

3. A brake apparatus comprising a plurality of shoes engageable with a drum and a permanently lubricated cam for operating the shoes.

4. A brake actuator comprising a substantially permanently lubricated synthetic resin.

5. A brake actuator comprising a cam member having a substantially permanently lubricated contact surface.

6. A brake actuator comprising a spreading member having a substantially, permanently lubricated contact surface.

7. A brake actuator comprising a spreading member having an oleaginous lubricant embodied therein.

8. A brake cam having substantially permanently lubricated shoe abutting and shaft sections.

9. A metallo-resin cam.

10. A cam comprising a metallic spider and a synthetic resin molded thereabout.

In testimony whereof I affix my signature.

RAYMOND J. NORTON.